United States Patent
Dagley et al.

(10) Patent No.: US 11,182,750 B1
(45) Date of Patent: Nov. 23, 2021

(54) VISUALIZING VEHICLE PART REPLACEMENT INFORMATION USING EXTENDED REALITY

(71) Applicant: Capital One Services, LLC, McLean, VA (US)

(72) Inventors: Geoffrey Dagley, McKinney, TX (US); Jason Hoover, Grapevine, TX (US); Micah Price, Anna, TX (US); Olalekan Awoyemi, Prosper, TX (US); Qiaochu Tang, The Colony, TX (US); Stephen Wylie, Carrollton, TX (US); Sunil Vasisht, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 37 days.

(21) Appl. No.: 16/861,498

(22) Filed: Apr. 29, 2020

(51) Int. Cl.
*G06Q 10/00* (2012.01)
*G06Q 10/08* (2012.01)
(Continued)

(52) U.S. Cl.
CPC .......... *G06Q 10/20* (2013.01); *G06F 16/787* (2019.01); *G06F 16/7837* (2019.01); *G06N 20/00* (2019.01); *G06Q 10/06395* (2013.01); *G06Q 10/083* (2013.01); *G06Q 10/0875* (2013.01); *G06Q 10/1097* (2013.01); *G06Q 30/0631* (2013.01); *G06Q 30/0633* (2013.01); *G06T 7/0004* (2013.01); *G06T 11/60* (2013.01);
(Continued)

(58) Field of Classification Search
CPC ............ G06Q 10/20; G06Q 10/06395; G06Q 10/083; G06Q 10/0875; G06Q 10/1097; G06Q 30/0631; G06Q 30/0633; G06F 16/7837; G06F 16/787; G06N 20/00; G06T 7/0004; G06T 11/60; G06T 2207/10016; G06T 2207/30252; G07C 5/0808
USPC ....................................................... 705/7.021
See application file for complete search history.

(56) References Cited

U.S. PATENT DOCUMENTS 7,970,636 B2 * 6/2011 Adachi ................ G06Q 30/014
705/7.11
9,472,028 B2 10/2016 Abdel-Rahman et al.
(Continued)

OTHER PUBLICATIONS

George et al "Vehicle Life-Cycle Costing with Probabilistic Part Replacement and Repair Options", Dec. 1981, Transportation Research Record 912, pp. 1-46 (Year: 1981).*
(Continued)

*Primary Examiner* — Romain Jeanty
(74) *Attorney, Agent, or Firm* — Harrity & Harrity, LLP

(57) ABSTRACT

A device having extended reality capabilities receives a video feed including one or more video frames depicting an object. The device provides the one or more video frames to a first machine learning model that identifies the object and one or more parts of the object that are depicted in the one or more video frames, and obtains positional tracking information that represents a position and an orientation associated with the object depicted in the one or more video frames relative to a coordinate space. The device identifies a plurality of parts from the one or more parts of the object that are depicted in the one or more video frames and determines, using one or more second machine learning models, information regarding the plurality of parts and information regarding one or more replacement parts.

20 Claims, 10 Drawing Sheets

(51) Int. Cl.
*G06Q 10/10* (2012.01)
*G06Q 10/06* (2012.01)
*G06F 16/787* (2019.01)
*G06Q 30/06* (2012.01)
*G06N 20/00* (2019.01)
*G06T 7/00* (2017.01)
*G06T 11/60* (2006.01)
*G07C 5/08* (2006.01)
*G06F 16/783* (2019.01)

(52) U.S. Cl.
CPC .. *G07C 5/0808* (2013.01); *G06T 2207/10016* (2013.01); *G06T 2207/20081* (2013.01); *G06T 2207/30252* (2013.01)

(56) References Cited

U.S. PATENT DOCUMENTS

| | | | | |
|---|---|---|---|---|
| 2005/0187838 A1* | 8/2005 | Sgueglia | ............... | G06Q 10/087 705/29 |
| 2006/0293906 A1* | 12/2006 | Wilson | ............... | G05B 19/4183 705/304 |
| 2018/0342116 A1* | 11/2018 | Wang | ............... | G06Q 10/20 |

OTHER PUBLICATIONS

Levski, Yariv, "5 Examples of Amazing Augmented Reality Car Repair Apps," AppReal-VR, 11 pages.
"How AR & VR Are Transforming the Car Buying Experience—Part 2," izmostudio, Nov. 30, 2018, 4 pages.

* cited by examiner

VISUALIZING VEHICLE PART REPLACEMENT INFORMATION USING EXTENDED REALITY

BACKGROUND

"Extended reality" (XR) is an umbrella term that encompasses augmented reality (AR), mixed reality (MR), virtual reality (VR), and everything in between. For example, augmented reality generally refers to interactive technologies in which objects in a real-world environment are augmented using computer-generated virtual content that may be overlaid on the real-world environment. "Mixed reality," sometimes referred to as "hybrid reality," similarly merges real and virtual worlds to produce a visual environment in which real physical objects and virtual digital objects can co-exist. However, in addition to overlaying virtual objects on the real-world environment, mixed reality applications often anchor the virtual objects to the real world and allow users to interact with the virtual objects. "Virtual reality" refers to fully immersive computer-generated experiences that take place in a simulated environment, often incorporating auditory, visual, haptic, and/or other feedback mechanisms.

SUMMARY

According to some implementations, a method may include capturing, by a device having extended reality capabilities, a video feed including one or more video frames depicting an object that is visible in a field of view of the device; providing, by the device, the one or more video frames to a first machine learning model that identifies the object depicted in the one or more video frames and one or more parts of the object that are depicted in the one or more video frames; obtaining, by the device, positional tracking information that represents a position and an orientation associated with the object depicted in the one or more video frames relative to a coordinate space that corresponds to the field of view of the device; identifying, by the device, a part from the one or more parts of the object that are depicted in the one or more video frames; determining, by the device and using one or more second machine learning models, information regarding the part and information regarding one or more replacement parts, wherein the one or more second machine learning models have been trained to predict information regarding a historical life cycle of the part and recommend one or more replacement parts that have historically been used to replace the part; and rendering, by the device, content, relative to the part, using the extended reality capabilities of the device, wherein the content identifies the information regarding the part and the information regarding the one or more replacement parts, wherein the information regarding the one or more replacement parts includes, for a replacement part of the one or more replacement parts, an option to automatically purchase the replacement part, an option to automatically schedule delivery of the replacement part, or an option to automatically schedule a service to install the replacement part.

According to some implementations, a device may include one or more memories and one or more processors. In some implementations, the one or more processors are communicatively coupled to the one or more memories. The one or more processors may be configured to: capture a video feed including one or more video frames depicting a vehicle that is visible in a field of view of the device; provide the one or more video frames to a first machine learning model that identifies the vehicle depicted in the one or more video frames and one or more parts of the vehicle that are depicted in the one or more video frames; obtain positional tracking information that represents a position and an orientation associated with the vehicle depicted in the one or more video frames relative to a coordinate space that corresponds to the field of view of the device; identify a part from the one or more parts of the vehicle that are depicted in the one or more video frames; determine, using one or more second machine learning models, information regarding the part and information regarding one or more replacement parts, wherein the one or more second machine learning models have been trained to predict information regarding a historical life cycle of the part and recommend one or more replacement parts that have historically been used to replace the part; and render content relative to the part, wherein the content identifies the information regarding the part and the information regarding the one or more replacement parts, wherein the information regarding the one or more replacement parts includes, for a replacement part of the one or more replacement parts, an option to automatically purchase the replacement part, an option to automatically schedule delivery of the replacement part, or an option to automatically schedule a service to install the replacement part.

According to some implementations, a non-transitory computer-readable medium may store one or more instructions. The one or more instructions, when executed by one or more processors, may cause the one or more processors to: receive a video feed including one or more video frames depicting an object that is visible in a field of view; provide the one or more video frames to a first machine learning model that identifies the object depicted in the one or more video frames and one or more parts of the object that are depicted in the one or more video frames; obtain positional tracking information that represents a position and an orientation associated with the object depicted in the one or more video frames relative to a coordinate space that corresponds to the field of view; identify a plurality of parts from the one or more parts of the object that are depicted in the one or more video frames; determine, using one or more second machine learning models, information regarding the plurality of parts and information regarding one or more replacement parts, wherein the one or more second machine learning models have been trained to predict information regarding failure information for the plurality of parts and recommend one or more replacement parts to replace the part; and render content relative to the plurality of parts, wherein the content identifies the information regarding the plurality of parts and the information regarding the one or more replacement parts, wherein the information regarding the one or more replacement parts includes, for a replacement part of the one or more replacement parts, an option to automatically purchase the replacement part, an option to automatically schedule delivery of the replacement part, or an option to automatically schedule a service to install the replacement part.

DETAILED DESCRIPTION

Figure 1A:
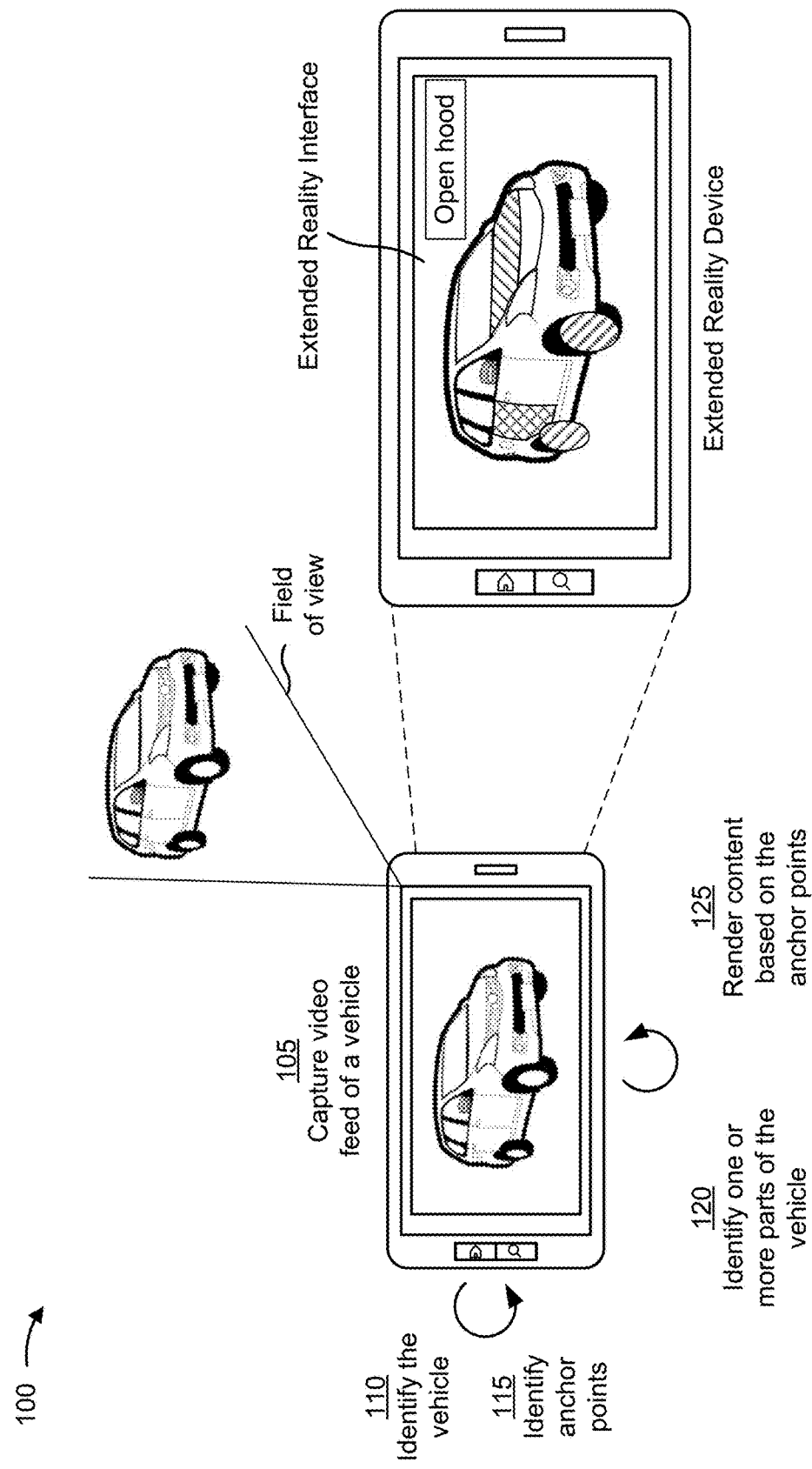
FIGS. 1A-1C are diagrams of one or more example implementations described herein.

The following detailed description of example implementations refers to the accompanying drawings. The same reference numbers in different drawings may identify the same or similar elements.

A user may drive a vehicle and realize that a problem exists concerning operation of the vehicle (e.g., based on how the vehicle is driving, a sound, a warning light, and/or the like). The user may have no or only limited knowledge regarding the vehicle and/or parts, components, and/or the like of the vehicle, and therefore the user may consume computing resources (e.g., processing resources, memory resources, power resources, communication resources, and/or the like) of a user device and/or network resources to research (e.g., using Internet searches and/or the like) the potential source of the problem. Even if the user successfully identifies a part associated with the problem, the user may consume computing resources of the user device and/or network resources to research and determine what part(s) can replace the problematic part, where suitable replacement parts can be purchased, a cost of the suitable replacement parts, which repair shops can perform a replacement, scheduling a service appointment with a repair shop, and/or the like.

Furthermore, to properly maintain the vehicle by replacing parts and/or having parts replaced, the user may consume computing resources of a user device and/or network resources researching the lifespan of particular parts in the vehicle to determine whether the particular parts need to be replaced. Additionally, or alternatively, if the user does not properly maintain the vehicle, the vehicle may lose monetary value, which may impact financial resources of the user and/or a financial institution that has a financial interest in the vehicle.

Some implementations described herein may provide a device having extended reality capabilities (e.g., a virtual reality device, an augmented reality device, a mixed reality device, and/or the like) and/or a part information visualization system that generates content for display using extended reality, where the content provides part information and/or replacement part information to the user. The extended reality device and/or the part information visualization system may visually provide information regarding the vehicle and the parts of the vehicle to the user as well as options for purchasing replacement parts, scheduling a service to replace a part, and/or the like. The extended reality device may display the information to the user to assist with the identification of the problem, identification of replacement parts, identification of parts that need to be replaced based on their lifespan, options regarding the replacement parts, and/or the like.

In some implementations, the extended reality device may capture a video feed of the vehicle, identify the vehicle, identify vehicle anchor points for rendering content, and render content, based on the anchor points, in an extended reality. For example, the content may include text including an instruction for the user to open the hood of the vehicle. The extended reality device may identify parts of the vehicle based on the video feed, and, using machine learning and/or information from the part information visualization system, determine information regarding a part in the video feed and one or more replacement parts.

In some implementations, the extended reality device may render content based on the part information (e.g., text instructing the user to change oil and an oil filter, text instructing the user to change an air filter, text instructing the user to replace a timing belt, and/or the like) and replacement part information (e.g., one or more replacement parts, lifespans of the one or more replacement parts, reliability of the one or more replacement parts, cost of the one or more replacement parts, and/or the like). The extended reality device may receive a user selection of a part and render content based on the user selection and the replacement part information. For example, the extended reality device may render content that includes an option to order a replacement part, an option to schedule delivery of a replacement part, an option to schedule a service to replace the part, and/or the like.

In this way, the extended reality device and/or the part information visualization system conserve computing resources (e.g., processing resources, memory resources, power resources, communication resources, and/or the like) and/or network resources that would otherwise be consumed by the user using a user device to research potential sources of problems, which parts can be used to replace a problematic part, where suitable replacement parts can be purchased, a cost of suitable replacement parts, which repair shops can perform a replacement, scheduling a service with a repair shop, and/or the like. Furthermore, the extended reality device and/or the part information visualization system conserve computing resources (e.g., processing resources, memory resources, power resources, communication resources, and/or the like) and/or network resources that would otherwise be consumed by the user device when the user attempts to maintain the vehicle and research the lifespan of every part in the vehicle to determine whether they need to be replaced. The extended reality device and/or the part information visualization system conserve financial resources otherwise consumed by improper maintenance of the vehicle (e.g., due to a lack of knowledge and/or the like), thereby preserving a value of the vehicle for the user and/or a financial institution that has a financial interest in the vehicle.

Figure 1B:
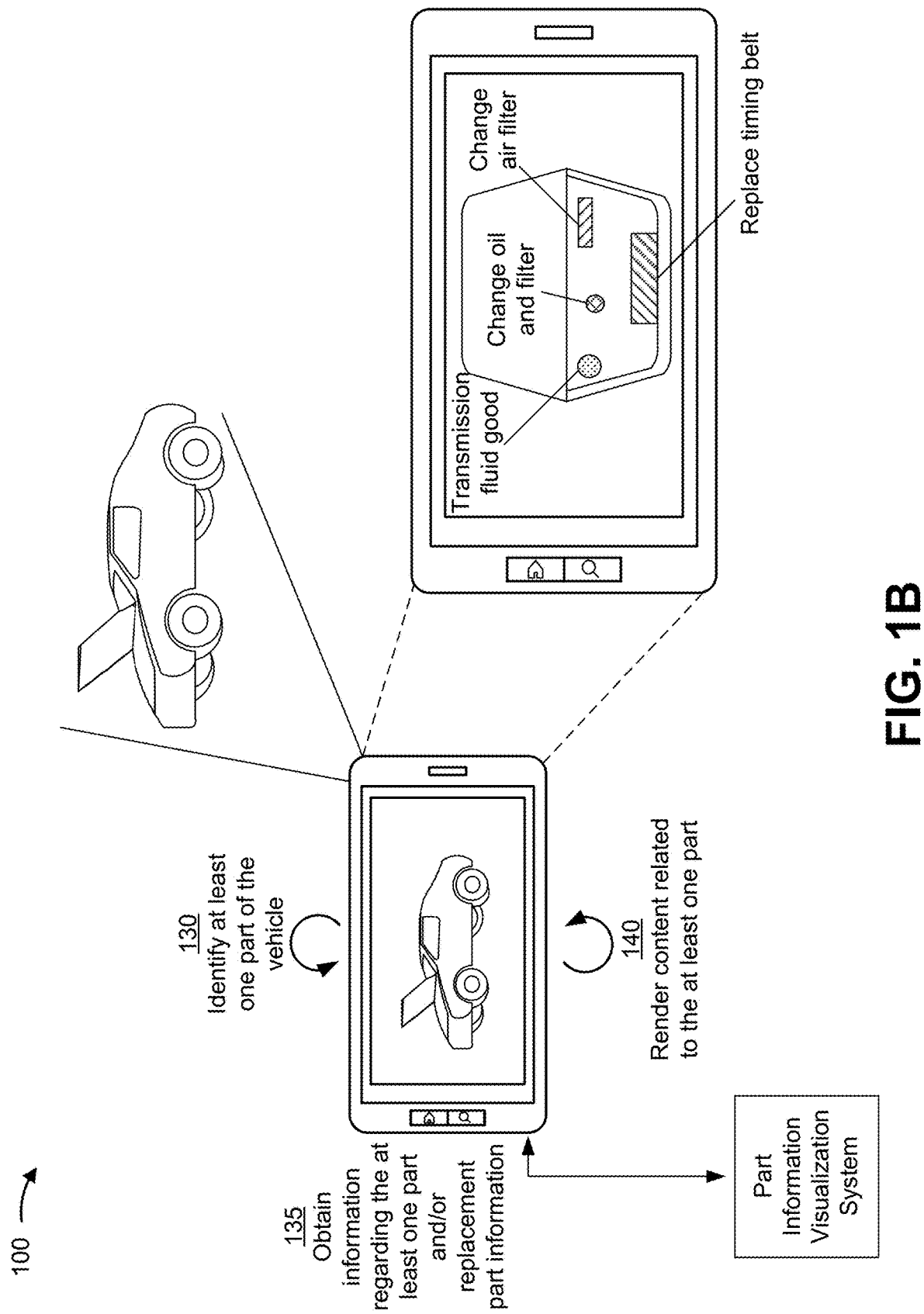
Figure 1C:
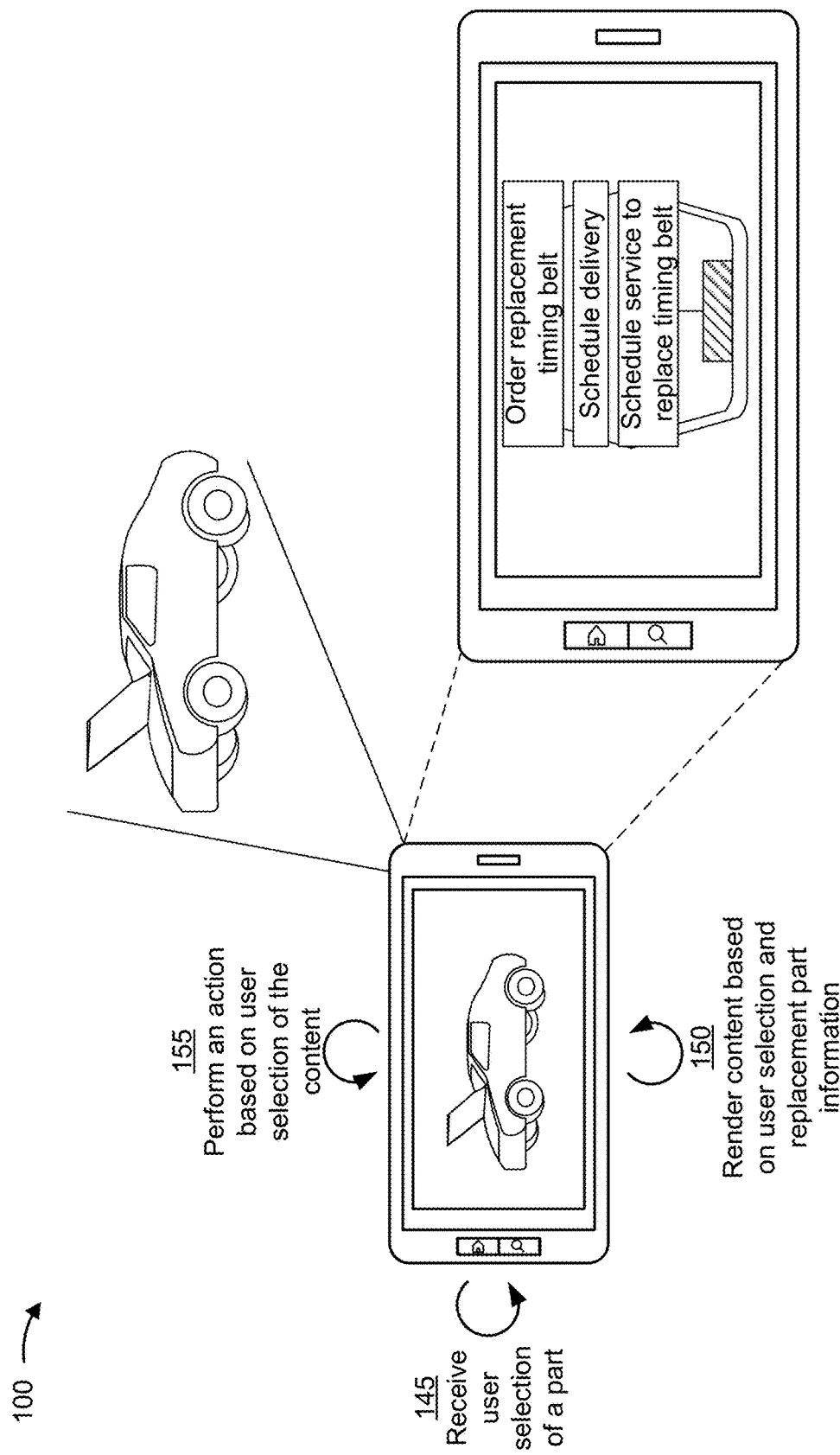

FIGS. 1A-1C are diagrams of one or more example implementations 100 described herein. As shown in FIGS. 1A-1C, example implementation(s) 100 includes an extended reality device (e.g., a device having extended reality capabilities) and a part information visualization system. In the following description, example implementation(s) 100 are described in a context that relates to visualizing information related to a vehicle, parts of a vehicle, and/or replacement parts for a vehicle using the extended reality device. However, it will be appreciated that this description is for illustration purposes only, and that the techniques described herein may be used to visualize information related to any suitable object (e.g., a house or other real estate, furniture, jewelry, electronic equipment, musical instrument, and/or the like), parts of the object, and/or replacement parts for the object.

In some implementations, a user (e.g., a vehicle owner, a potential purchaser of a vehicle, a vehicle mechanic, a vehicle inspector, an insurance adjuster, and/or the like) may interact with the extended reality device (e.g., via a user interface of the extended reality device) to cause the extend reality device to open and/or run an application on the extended reality device. In some implementations, the application may relate to providing information related to a vehicle (e.g., a car, a truck, a motorcycle, a bus, a boat, farm equipment, construction equipment, and/or the like), parts of the vehicle, and/or replacement parts for the vehicle. The application may be downloaded to or pre-installed on the extended reality device. The extended reality device, when running the application, may access a camera device (e.g., that includes one or more cameras) of the extended reality device and display (e.g., on a display, such as a touchscreen display) a field of view of the camera device. The user may orient the extended reality device such that a vehicle is within (e.g., is visible in) the field of view.

As shown in FIG. 1A, and by reference number 105, the extended reality device may capture (e.g., using the camera device of the extended reality device) a video feed of the field of view of the camera device. The video feed may include one or more video frames depicting the vehicle in the field of view. The extended reality device may display the video feed on the display of the extended reality device.

In some implementations, the extended reality device may capture the video feed automatically (e.g., upon opening or running of the application on the extended reality device and/or without any input from the user), which conserves computing resources that might otherwise be used to process a signal or instruction to obtain the video feed. In some implementations, the extended reality device may obtain the video feed upon occurrence of a triggering event, which conserves camera device resources that would otherwise be used to capture a portion of the video feed that will not be used (e.g., a portion of the video feed that is not beneficial to identifying the vehicle and/or parts of the vehicle, as described herein). The triggering event may include receiving an instruction from the user to initiate capturing the video feed, detecting that the vehicle is located within the field of view of the camera, and/or the like.

As shown by reference number 110, the extended reality device may process the video feed to identify the vehicle. For example, the video feed may include an image of a vehicle identification number (VIN); an image of a license plate of the vehicle; an image of an emblem, a nameplate, a badge and/or the like of the vehicle (e.g., that indicates a make and/or a model of the vehicle), and/or the like, and the extended reality device may use image processing techniques (e.g., optical character recognition (OCR) techniques, computer vision techniques, and/or the like) to identify the vehicle.

In some implementations, the extended reality device may prompt the user to provide input identifying the vehicle. For example, the extended reality device may prompt the user to select a manufacturer, a model, and/or a model year of the vehicle, to input the VIN, to capture an image of the VIN, to capture an image of the license plate, and/or the like. The extended reality device may provide the prompts to the user by displaying text on the display, displaying input buttons for selecting the manufacturer, model, and/or model year of the vehicle, providing audio instructions, and/or the like. The extended reality device may receive the user input, for example, via a touchscreen, a speech-based input device (e.g., a microphone), a gesture-recognition device, and/or the like of the extended reality device. The extended reality device may identify the vehicle based on the user input.

Additionally, or alternatively, the extended reality device may obtain information regarding the vehicle via a machine-to-machine communication interface (e.g., a wireless communication interface, such as a Bluetooth communication interface) between the device and the vehicle. The information regarding the vehicle may indicate the manufacturer, the model, the model year of the vehicle, and/or the like. The extended reality device may identify the vehicle based on the information regarding the vehicle.

In some implementations, the extended reality device provides the one or more video frames of the video feed to a machine learning model that identifies the vehicle. For example, the extended reality device may process the video feed, the one or more video frames of the video feed, the user input, the information regarding the vehicle, and/or the like using the machine learning model to identify the vehicle. In some implementations, the extended reality device (or another device, such as the part information visualization system) may train the machine learning model using historical video feeds, historical video frames, historical user input, historical information regarding vehicles, historical vehicle identifications, and/or the like. Using the historical data as inputs to the machine learning model, the network testing device may identify one or more relationships for identifying a vehicle. The machine learning model may be trained and/or used in a similar manner to that described below with respect to FIGS. 2 and 3.

As further shown in FIG. 1A, and by reference number 115, the extended reality device may identify, based on the video feed, one or more anchor points (e.g., for rendering content corresponding to the vehicle on the display of the extended reality device). The one or more anchor points may represent a position and/or an orientation associated with the vehicle depicted in the one or more video frames of the video feed relative to a coordinate space that corresponds to the field of view of the camera device of the extended reality device. In some implementations, content (e.g., virtual objects) may be rendered within the coordinate space according to a pose of the extended reality device. For example, the pose of the extended reality device may be expressed according to six degrees of freedom, which includes a three-dimensional position of the extended reality device combined with pitch, roll, and yaw representing an orientation through rotation about three perpendicular axes. Accordingly, the one or more anchor points may represent a relative position and orientation of one or more corresponding points (e.g., of the vehicle) in the field of view of the extended reality device for a particular frame, and a pose of the one or more anchor points within the coordinate space may be automatically updated based on changes to the pose of the extended reality device.

In some implementations, the one or more anchor points may be identified based on one or more parts of the vehicle that are depicted in the video feed. For example, as shown in FIG. 1A, the parts of the vehicle depicted in the video feed include a front bumper, front headlights, a hood, a windshield, a fender, passenger-side tires, passenger-side doors, a passenger-side mirror, a gas tank door, a quarter panel, and/or the like. Accordingly, as shown by reference number 120, the extended reality device may identify the one or more parts of the vehicle that are depicted in the one or more video frames of the video feed. In some implementations, the extended reality device may be configured to use one or more image processing techniques (e.g., a computer vision technique, an object detection technique, an image segmentation technique, an object in motion technique, and/or the like) to identify the one or more parts of the vehicle that are depicted in the one or more video frames of the video feed.

Furthermore, using the one or more image processing techniques, the extended reality device may identify any suitable interior and/or exterior part of the vehicle. For example, the hood of the vehicle may be opened to reveal an engine bay, and the extended reality device may analyze at least one video frame corresponding to the engine bay to identify an intake manifold, a battery, an alternator, various fluid compartments, and/or the like. In another example, at least one video frame may correspond to an interior part of the vehicle, and the extended reality device may analyze the at least one video frame to identify an instrument panel, an infotainment system, floor pedals, a steering wheel, a glove compartment, and/or the like. In some implementations, the extended reality device may obtain one or more models of the vehicle (e.g., schematics based on a make, model, and year of the vehicle), which may be used to identify the one or more parts of the vehicle using the one or more image processing techniques.

In some implementations, the extended reality device provides the one or more video frames of the video feed to a machine learning model (e.g., the same machine learning model as described above or a different machine learning model) that identifies the one or more parts of the vehicle. For example, the extended reality device may process the video feed, the one or more video frames of the video feed, the identification of the vehicle, the one or more anchor points, the one or more models of the vehicle and/or the like, using the machine learning model to identify the one or more parts of the vehicle. In some implementations, the extended reality device (or another device, such as the part information visualization system) may train the machine learning model using historical video feeds, historical video frames, historical vehicle identifications, historical anchor points, historical vehicle models, historical vehicle part identifications, and/or the like. Using the historical data as inputs to the machine learning model, the network testing device may identify one or more relationships for identifying one or more parts of a vehicle. The machine learning model may be trained and/or used in a similar manner to that described below with respect to FIGS. 2 and 3.

As further shown in FIG. 1A, and by reference number 125, the extended reality device may render, based on the anchor points, content on the display of the extended reality device (e.g., in an extended reality interface). For example, as mentioned above, the extended reality device may identify the one or more anchor points to represent the one or more parts of the vehicle depicted in the video feed as trackable objects in the coordinate space corresponding to the field of view of the extended reality device. Accordingly, when rendering the content, the content may be placed within the coordinate space using the one or more anchor points that correspond to the one or more parts of the vehicle. In this way, when the pose of the extended reality device changes, the relative position and orientation of the one or more anchor points may remain fixed to the one or more parts.

Additionally, or alternatively, the content may include colored overlays, holograms, digital or virtual objects, textual descriptions (e.g., within a billboard or text box), visual markers, superimposed graphics, and/or the like. For example, as shown in FIG. 1A, the content includes a first patterned overlay placed on the hood of the vehicle, a second patterned overlay placed on the passenger-side tires of the vehicle, and a third patterned overlay placed on the rear passenger-side door of the vehicle. As another example, as shown in FIG. 1A, the content may include a text box including the text "Open hood" to instruct the user to open the hood of the vehicle.

As shown in FIG. 1B and by reference number 130, the extended reality device may identify and/or select at least one part of the one or more parts of the vehicle. For example, the extended reality device, upon determining that the hood is open, may identify at least one part in the engine bay of the vehicle based on the video feed. In some implementations, the extended reality device may prompt the user to provide input identifying the at least one part. The extended reality device may provide prompts to the user by displaying text on the display, displaying input buttons for selecting the at least one part, highlighting individual parts of the one or more parts on the display, providing audio instructions, and/or the like. The extended reality device may receive the user input (e.g., via a touchscreen, a speech-based input device, such as a microphone, a gesture-recognition device, and/or the like) and may process the user input to identify the at least one part.

As shown by reference number 135, the extended reality device may obtain information regarding the at least one part and/or information regarding one or more replacement parts (e.g., replacement parts suitable for replacing the at least one part and/or the like). The information regarding the at least one part may include an indication of a remaining lifespan of the at least one part. The information regarding the one or more replacement parts may include an indication of a lifespan of the one or more replacement parts, an indication of a premature failure rate of the one or more replacement parts (e.g., based on a comparison of the lifespan of the one or more replacement parts and historical failures), and/or the like. Additionally, or alternatively, the information regarding the one or more replacement parts may identify, for a replacement part of the one or more replacement parts, an option to automatically purchase the replacement part, an option to automatically schedule delivery of the replacement part, an option to automatically schedule a service to install the replacement part, and/or the like.

As shown in FIG. 1B, the information regarding the at least one part and/or the information regarding one or more replacement parts may be obtained from the part information visualization system. In some implementations, the extended reality device may connect (e.g., through a network) to the part information visualization system (e.g., any time after the extended reality device opens the application, as described above). For example, the extended reality device may connect to the part information visualization system as the application is opening, after the application has opened, after the extended reality device displays the field of view of the camera device, after the extended reality device detects a vehicle within the field of view of the camera device, and/or the like. In some implementations, the extended reality device connects to the part information visualization system by logging into the inspection support system using credentials, such as credentials of the user.

In some implementations, the extended reality device may provide, to the part information visualization system, information identifying the vehicle (e.g., the VIN, the make or model of the vehicle, and/or the like), information identifying the one or more parts of the vehicle, information identifying the at least one part, and/or the video feed. Based on the information identifying the vehicle, the information identifying the one or more parts of the vehicle, the information identifying the at least one part, and/or the video feed, the part information visualization system may determine and/or identify the at least one part from the one or more parts of the vehicle and determine the information regarding the at least one part and the information regarding the one or more replacement parts.

In some implementations, the part information visualization system may obtain aggregated data regarding similar vehicles (e.g., same manufacturer, same model, same model year, same feature package, same color, same class of vehicle, and/or the like) gathered regarding the visually observable characteristics of the one or more parts and determine the information regarding the at least one part and the information regarding the one or more replacement parts based on the aggregated data. For example, the part information visualization system may obtain data gathered by other users while diagnosing (e.g., due to one or more quality control issues) other vehicles (e.g., a group of vehicles of which the vehicle is a member), other parts (e.g., a group of parts of which the at least one part is a member), and/or the like using another extended reality device in connection with the part information visualization system. Based on the aggregated data, the part information visualization system may determine the information regarding the at least one part and the information regarding the one or more replacement parts.

In some implementations, the part information visualization system may process the information identifying the vehicle, the information identifying the one or more parts of the vehicle, the information identifying the at least one part, and/or the video feed using a machine learning model (e.g., at least one of the machine learning model described above or a different machine learning model) that determines and/or identifies the information regarding the at least one part and the information regarding one or more replacement parts. In some implementations, the extended reality device (or another device, such as the part information visualization system) may train the machine learning model using historical video feeds, historical video frames, historical vehicle identifications, historical anchor points, historical vehicle models, historical vehicle part identifications, historical life cycles of vehicle parts, historical replacement parts of vehicle parts, and/or the like. Using the historical data as inputs to the machine learning model, the network testing device may identify one or more relationships for identifying information regarding at least one part and/or information regarding one or more replacement parts for the at least one part. The machine learning model may be trained and/or used in a similar manner to that described below with respect to FIGS. 2 and 3.

While FIG. 1B shows the extended reality device obtaining the information regarding the at least one part and/or the replacement part information from the part information visualization system, some implementations include the extended reality device determining the information regarding the at least one part and the information regarding one or more replacement parts without communicating with the part information visualization system (or any other device). In some implementations, the extended reality device may perform some or all of the processing steps described herein as being performed by the part information visualization system.

In some implementations, the extended reality device may determine a total cost of owning the vehicle based on the information regarding the at least one part and/or the information regarding one or more replacement parts. For example, the extended reality device may determine a set of parts of the at least one part that should be repaired or replaced and may determine a cost of repairing or replacing the set of parts.

As shown by reference number 140, the extended reality device may render content related to the at least one part (e.g., based on the information regarding the at least one part and/or the information regarding one or more replacement parts). The content may identify the information regarding the at least one part and/or the information regarding the one or more replacement parts. Additionally, or alternatively, the content may include information regarding the total cost of owning the vehicle. In some implementations, the content includes two-dimensional overlays (e.g., that include texture, shading, highlighting, and/or the like), holograms, digital or virtual objects, textual descriptions (e.g., within a billboard or text box), visual markers, superimposed graphics, and/or the like to be placed over images of the at least one part that are depicted in the one or more video frames (e.g., based on the positional tracking information). For example, as shown in FIG. 1B, the content may include shaded and/or textured overlays that indicate that the transmission fluid of the vehicle is good, the oil and oil filter of the vehicle should be changed, the air filter of the vehicle should be changed, the timing belt of the vehicle should be replaced, and/or the like. Additionally, or alternatively, a color of the overlay may vary based on the remaining lifespan of the part associated with the overlay.

As shown in FIG. 1C and by reference number 145, the extended reality device may receive a user selection of a part of the one or more parts of the vehicle (e.g., that may be displayed on the display of the extended reality device via rendering the content related to the at least one part). For example, the extended reality device may prompt the user to select a part by displaying text on the display, displaying input buttons for selecting a part, providing audio instructions, and/or the like. The extended reality device may receive the user selection (e.g., via a touchscreen, a speech-based input device, such as a microphone, a gesture-recognition device, and/or the like) and may process the user selection to identify the part.

As shown by reference number 150, the extended reality device may render content related to the part (e.g., the part associated with the user selection) and information regarding one or more replacement parts associated with the part. The content may include instructions for replacing the part (e.g., with the one or more replacement parts associated with the part). Additionally, or alternatively, the content may include a request for input from the user regarding one or more actions to be performed by the extended reality device. For example, the content may include virtual buttons, a menu, and/or the like for selecting an action, such as ordering the one or more replacement parts associated with the part, scheduling delivery of the one or more replacement parts, scheduling a service appointment to replace and/or repair the part, and/or the like.

As further shown in FIG. 1C and by reference number 155, the extended reality device may receive a user selection of the content and may perform the one or more actions based on the user selection of the content. For example, the user may interact with the virtual buttons, the menu, and/or the like (e.g., that is rendered on the display of the extended reality device) to indicate the user selection. The extended reality device may perform, based on the user selection, the one or more actions, such as ordering the one or more replacement parts associated with the part, scheduling delivery of the one or more replacement parts, scheduling a service appointment to replace and/or repair the part, and/or the like.

As indicated above, FIGS. 1A-1C are provided as one or more examples. Other examples may differ from what is described with regard to FIGS. 1A-1C.

Figure 2:
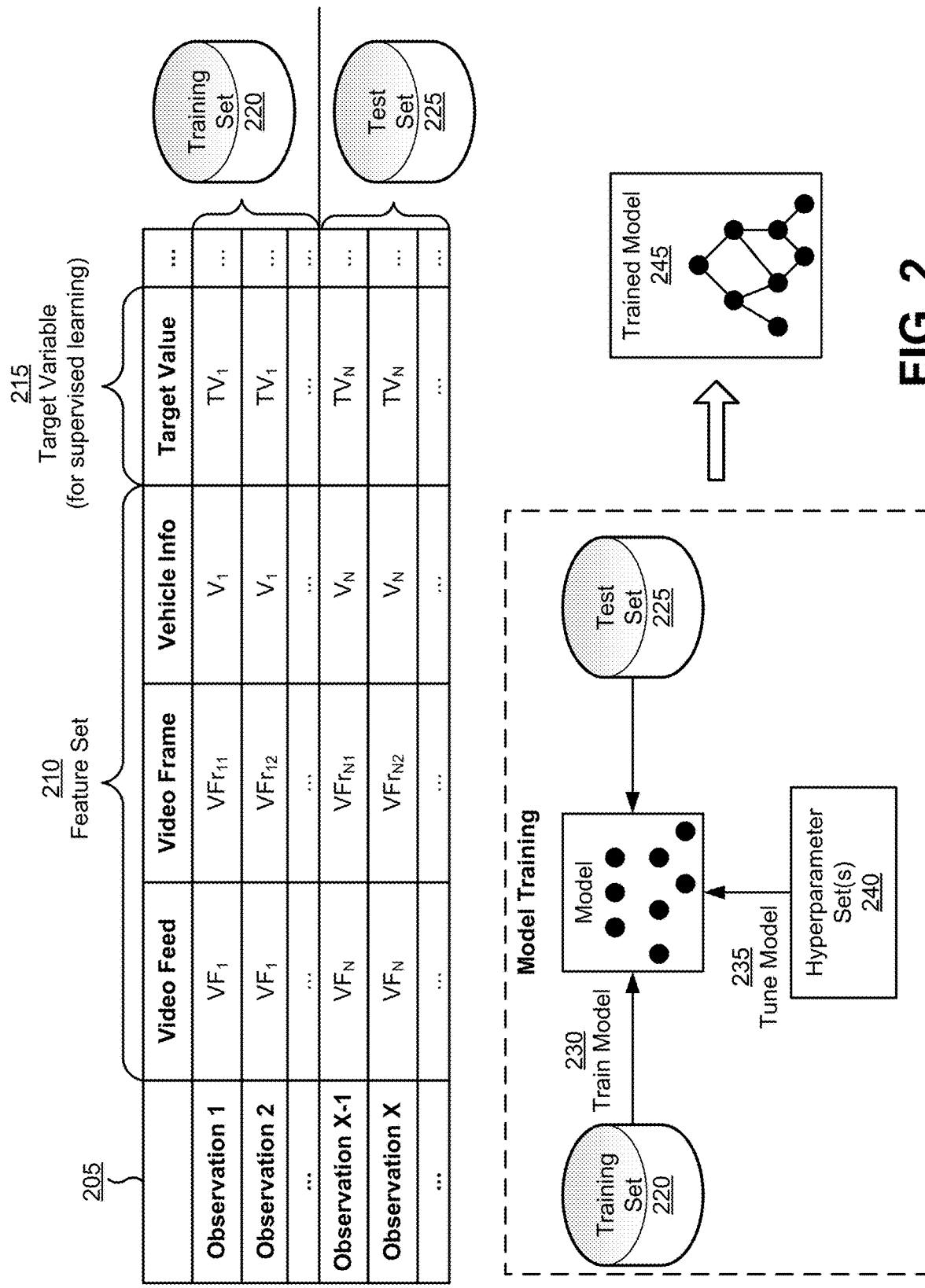
FIGS. 2 and 3 are diagrams of one or more example implementations described herein.

FIG. 2 is a diagram illustrating an example 200 of training a machine learning model. The machine learning model training described herein may be performed using a machine learning system. The machine learning system may include a computing device, a server, a cloud computing environment, an extended reality device, a part information visualization system, and/or the like.

As shown by reference number 205, a machine learning model may be trained using a set of observations. The set of observations may be obtained and/or input from historical data, such as data gathered during one or more processes described herein. For example, the set of observations may include data gathered from capturing a video feed and identifying a vehicle (e.g., a make and/or model of the vehicle) depicted in the video feed, as described elsewhere herein. In some implementations, the machine learning system may receive the set of observations (e.g., as input) from the extended reality device, the part information visualization system, and/or the like.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from the extended reality device, the part information visualization system, and/or the like. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variable types) for a feature set based on input received from the extended reality device, the part information visualization system, and/or the like, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of a video feed, a second feature of a video frame of the video feed, a third feature of information regarding a vehicle depicted in the video feed, and so on. As shown, for a first observation, the first feature may have a value of video feed $VF_1$, the second feature may have a value of video frame $VFr_{11}$, the third feature may have a value of information regarding a vehicle $V_1$. As further shown, for an $X^{th}$ observation, the first feature may have a value of video feed $VF_N$ (where N>1), the second feature may have a value of video frame $VFr_{N1}$, the third feature may have a value of information regarding a vehicle $V_N$ (e.g., an $N^{th}$ vehicle associated with the $N^{th}$ video feed), and so on. These features and feature values are provided as examples, and may differ in other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation (e.g., $TV_1$ may indicate a make and/or model of a first vehicle, $TV_N$ may indicate a make and/or model of an $N^{th}$ vehicle, and/or the like). In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. For example, the machine learning system may utilize image recognition, object detection, image segmentation, and/or the like to determine the set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. Additionally, or alternatively, the machine learning algorithm may include a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2.

Figure 3:
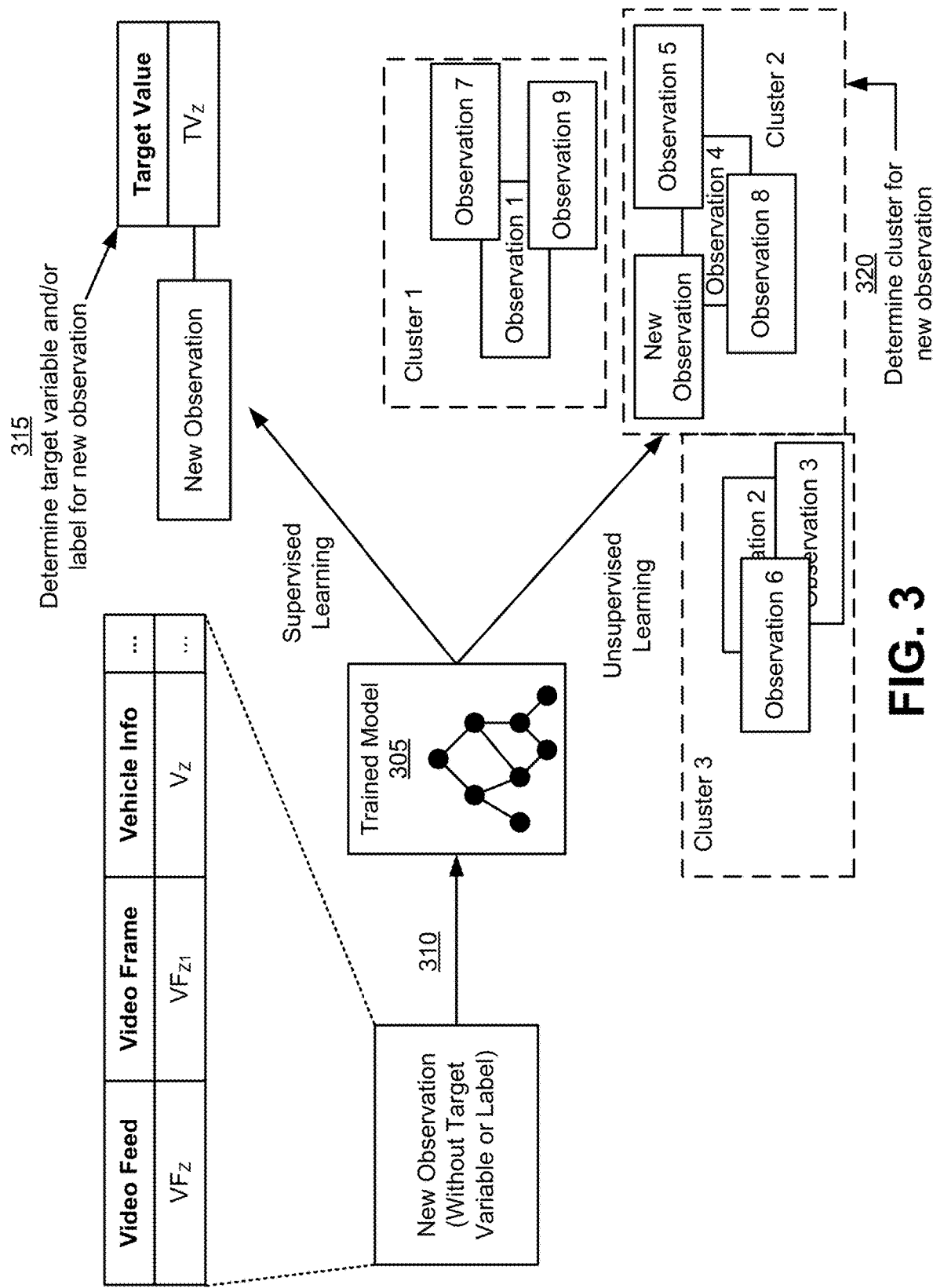

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include a computing device, a server, a cloud computing environment, an extended reality device, a part information visualization system, and/or the like.

As shown by reference number 310, the machine learning system may receive a new observation (or a set of new observations), and may input the new observation to the machine learning model 305. As shown, the new observation may include a first feature of a video feed, a second feature of a video frame of the video feed, a third feature of information regarding a vehicle depicted in the video feed, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of a target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed. Additionally, or alternatively, the output may include bounding box coordinates of detected class objects of the new observation (e.g., associated with object detection), a pixel-level mask of detected object locations of the new observation (e.g., associated image segmentation), and/or the like.

In some implementations, the trained machine learning model 305 may predict a value of $TV_Z$, for example, for the target variable of a vehicle identification for the new observation, as shown by reference number 315. Additionally, or alternatively, the machine learning system may perform an automated action and/or may cause an automated action to be performed (e.g., by instructing another device to perform the automated action), such as rendering content that indicates the vehicle identification on a screen of the extended reality device. In some implementations, the recommendation and/or the automated action may be based on the target variable value having a particular label (e.g., classification, categorization, and/or the like), may be based on whether the target variable value satisfies one or more thresholds (e.g., whether the target variable value is greater than a threshold, is less than a threshold, is equal to a threshold, falls within a range of threshold values, and/or the like), and/or the like.

In some implementations, the trained machine learning model 305 may classify (e.g., cluster) the new observation in a particular cluster, as shown by reference number 320. The observations within a cluster may have a threshold degree of similarity. Based on classifying the new observation in the particular cluster, the machine learning system may perform an automated action and/or may cause an automated action to be performed (e.g., by instructing another device to perform the automated action), such as rendering content that indicates the vehicle identification on a screen of the extended reality device.

In this way, the machine learning system may apply a rigorous and automated process to identifying a vehicle. The machine learning system enables recognition and/or identification of tens, hundreds, thousands, or millions of features and/or feature values for tens, hundreds, thousands, or millions of observations, thereby increasing an accuracy and consistency of identifying a vehicle relative to requiring computing resources to be allocated for tens, hundreds, or thousands of operators to manually identify a vehicle using the features or feature values. In some implementations, the same or similar machine learning system may be used to identify one or more parts of a vehicle, determine information regarding at least one part of a vehicle and/or information regarding one or more replacement parts, and/or the like.

As indicated above, FIG. 3 is provided as an example. Other examples may differ from what is described in connection with FIG. 3.

Figure 4:
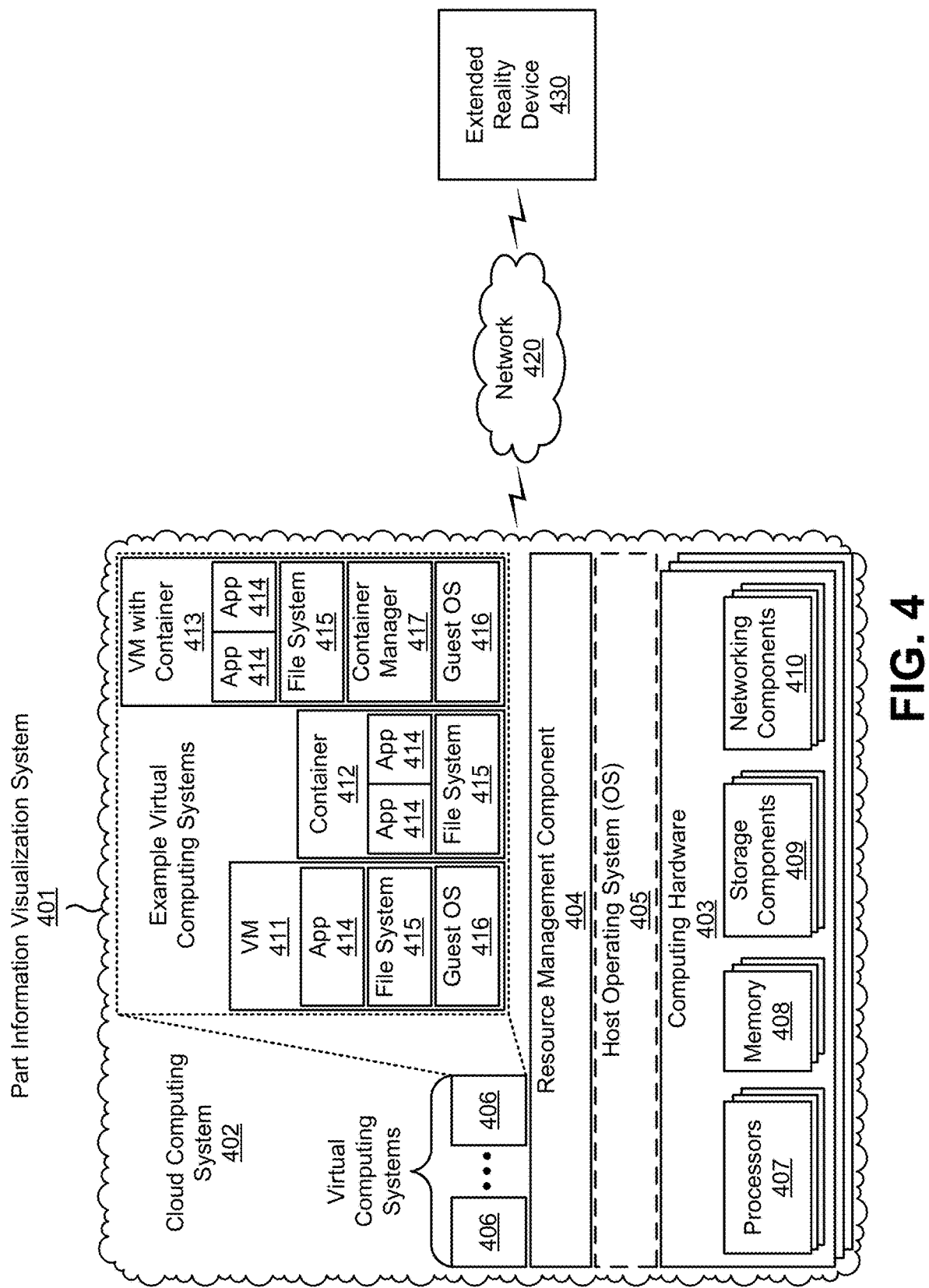
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a part information visualization system 401. The part information visualization system 401 may include one or more elements of a cloud computing system 402 and/or may execute within the cloud computing system 402 (e.g., as one or more virtual computing systems 406). The cloud computing system 402 may include one or more elements 403-417, as described in more detail below. As further shown in FIG. 4, environment 400 may include a network 420, and/or an extended reality device 430. Devices of environment 400 may interconnect via wired connections, wireless connections, or a combination of wired and wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using such virtualization, the resource management component 404 enables a single computing device (e.g., a computer, a server, a host device, and/or the like) to operate as if the single computing device were multiple computing devices, such as by creating multiple isolated virtual computing systems 406 from computing hardware 403 of the single computing device. The multiple virtual computing systems 406 operate independently from one another and do not interact with one another. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server or host device) or from multiple computing devices (e.g., multiple servers or host devices), such as multiple computing devices in one or more data centers, server farms, server pools, and/or the like. As shown, computing hardware 403 may include one or more processors 407, one or more memories 408, one or more storage components 409, and/or one or more networking components 410. Computing hardware 403 may be interconnected via one or more wired and/or wireless buses, which may interconnect computing hardware 403 within a single computing device and/or across multiple computing devices.

A processor 407 includes a central processing unit, a graphics processing unit, and/or the like. A memory 408 includes random access memory, read-only memory, and/or the like. The memory 408 may store a set of instructions (e.g., one or more instructions) for execution by the processor 407. The processor 407 may execute the set of instructions to perform one or more operations or processes described herein. In some implementations, execution of the set of instructions, by one or more processors 407, causes the one or more processors 407 and/or the part information visualization system 401 to perform one or more operations or processes described herein. A storage component 409 includes a hard disk or another type of storage device that stores information, data, and/or software (e.g., code, instructions, and/or the like) related to the operation and use of the part information visualization system 401. In some implementations, memory 408 and/or storage component 409 is/are implemented as a non-transitory computer readable medium. A networking component 410 includes a network interface and corresponding hardware that enables the part information visualization system 401 to communicate with other devices of environment 400 via a wired connection and/or a wireless connection, such as via network 420. Additional examples of a processor, a memory, a storage component, and a networking component (e.g., a communication interface) are described elsewhere herein.

The resource management component 404 includes a virtualization application (e.g., executing on hardware, such as computing hardware 403) capable of virtualizing computing hardware 403 to start (e.g., create or spin up), stop (e.g., delete or tear down), and/or manage one or more virtual computing systems 406. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 404 may control access to and/or use of computing hardware 403 and/or software executing on computing hardware 403. Additionally, or alternatively, the resource management component 404 may perform binary rewriting to scan instructions received from a virtual computing system 406 and replace any privileged instructions with safe emulations of those instructions. The resource management component 404 may include a hypervisor or a virtual machine monitor, such as when the virtual computing systems 406 are virtual machines 411. Additionally, or alternatively, the resource management component 404 may include a container manager, such as when the virtual computing systems 406 are containers 412.

In some implementations, the resource management component 404 executes within and/or in coordination with a host operating system 405. For example, the resource management component 404 may execute on top of the host operating system 405 rather than interacting directly with computing hardware 403, such as when the resource management component 404 is a hosted hypervisor (e.g., a Type 2 hypervisor) or a container manager. In this case, the host operating system 405 may control access to and/or use of computing hardware 403 and/or software executing on computing hardware 403 based on information and/or instructions received from the resource management component 404. Alternatively, the resource management component 404 may interact directly with computing hardware 403 rather than interacting with the host operating system 405, such as when the resource management component 404 is a bare-metal hypervisor (e.g., a Type 1 hypervisor). Thus, in some implementations, the cloud computing system 402 does not include a host operating system 405. In some implementations, the host operating system 405 includes and/or executes an administrator application to enable a system administrator to manage, customize, and/or configure cloud computing system 402.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications 414 using a file system 415. The file system 415 may include binary files, software libraries, and/or other resources required to execute applications 414 on a guest operating system 416 or the host operating system 405. In some implementations, a virtual computing system 406 (e.g., a virtual machine 411 or a hybrid environment 413) includes a guest operating system 416. In some implementations, a virtual computing system 406 (e.g., a container 412 or a hybrid environment 413) includes a container manager 417.

A virtual machine 411 is an emulation of a computing device that enables execution of separate, isolated instances of virtual computing devices (e.g., multiple virtual machines 411) on the same computing hardware 403. The guest operating systems 416 and applications 414 of multiple virtual machines 411 may share computing hardware 403 from a single computing device or from multiple computing devices (e.g., a pool of computing devices). Each separate virtual machine 411 may include a guest operating system 416, a file system 415, and one or more applications 414. With a virtual machine 411, the underlying computing hardware 403 is virtualized, and the guest operating system 416 executes on top of this virtualized hardware. Using virtual machines 411 enables different types of guest operating systems 416 to execute on the same computing hardware 403 in an isolated environment, but with more resource usage and overhead than containers 412.

Unlike a virtual machine 411, a container 412 virtualizes a host operating system 405 rather than the underlying computing hardware 403. Thus, a container 412 does not require a guest operating system 416 because the application (s) 414 included in the container 412 execute directly on the host operating system 405 using a file system 415 included in the container 412. Each separate container 412 may share the kernel of the host operating system 405, and different applications 414 within a single container 412 may share a file system 415. This sharing of a file system 415 among multiple applications 414 reduces the need to reproduce operating system code for different applications, and enables a single host operating system 405 to execute multiple applications 414 and/or containers 412. As a result, containers 412 enable a greater quantity of applications 414 to execute on a smaller quantity of computing devices as compared to virtual machines 411.

A hybrid environment 413 includes elements of a virtual machine 411 and a container 412. For example, a hybrid environment 413 may include a guest operating system 416 that executes on top of virtualized hardware. A container manager 417 may execute on top of the guest operating system 416 to start, stop, and/or manage one or more containers within the hybrid environment 413. Using a hybrid environment 413 enables different types of guest operating systems 416 to execute on the same computing hardware 403 in an isolated environment, while also enabling lightweight containers to execute on top of the guest operating system 416.

The quantity of applications 414 shown in FIG. 4 as executing within each virtual computing system 406 is shown as an example, and a different quantity of applications 414 may execute within each virtual computing system. Furthermore, although the part information visualization system 401 may include one or more elements 403-417 of the cloud computing system 402, may execute within the cloud computing system 402, and/or may be hosted within the cloud computing system 402, in some implementations, the part information visualization system 401 may not be cloud-based (e.g., may be implemented outside of a cloud computing system) or may be partially cloud-based. For example, the part information visualization system 401 may include one or more devices that are not part of the cloud computing system 402, such as device 500 of FIG. 5, which may include a standalone server or another type of computing device. The part information visualization system 401 may perform one or more operations and/or processes described in more detail elsewhere herein.

Network 420 includes one or more wired and/or wireless networks. For example, network 420 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 420 enables communication among the devices of environment 400.

Extended reality device 430 includes one or more devices capable of receiving, generating, storing, processing, displaying, and/or providing information associated with one or more parts of a vehicle, as described herein. For example, extended reality device 430 may be a device having augmented reality and/or mixed reality capabilities, such as an optical see-through display device, a video see-through display device, a holographic display device, a heads-up display device, a smartphone, a tablet computer, a handheld computer, and/or the like. Additionally, or alternatively, extended reality device 430 may be a virtual reality device, such as a virtual reality headset, a head-mounted display device, and/or the like. Extended reality device 430 may include a camera device (e.g., that includes one or more cameras) to capture a video feed of a vehicle. Extended reality device 430 includes one or more display devices capable of rendering digital content in combination with the video feed of the vehicle to represent information related to one or more parts of the vehicle. For example, in some implementations, the one or more display devices may include technologies such as liquid crystal display (LCDs) devices, light-emitting diode (LED) display devices, plasma display devices, wearable display devices (e.g., head-mounted display devices), handheld display devices, stereoscopic or three-dimensional display devices, and/or the like.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
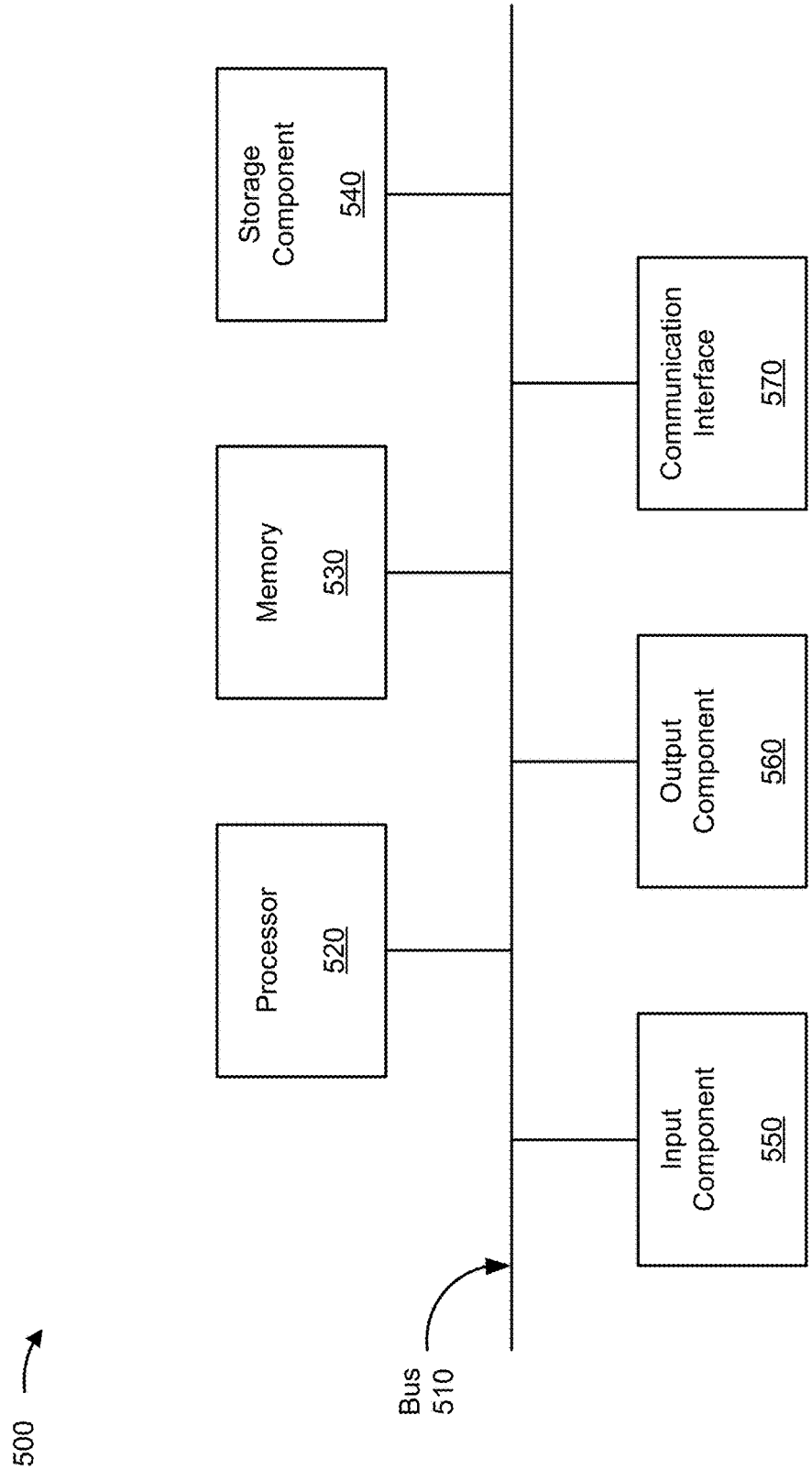
FIG. 5 is a diagram of example components of one or more devices of FIG. 2.

FIG. 5 is a diagram of example components of a device 500. Device 500 may correspond to part information visualization system 401, processor 407, and/or extended reality device 430. In some implementations, part information visualization system 401, processor 407, and/or extended reality device 430 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among multiple components of device 500. Processor 520 is implemented in hardware, firmware, and/or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component), an image acquisition component (e.g., a camera) for capturing a video feed, and/or a sensor (e.g., an accelerometer, a gyroscope, an actuator, another type of positional or environmental sensor, and/or the like). Output component 560 includes a component that provides output information from device 500 (via, e.g., a display (e.g., an extended reality display), a speaker, a haptic feedback component, an audio or visual indicator, and/or the like).

Communication interface 570 includes a transceiver-like component (e.g., a transceiver, a separate receiver, a separate transmitter, and/or the like) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. As used herein, the term "computer-readable medium" refers to a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as one or more examples. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
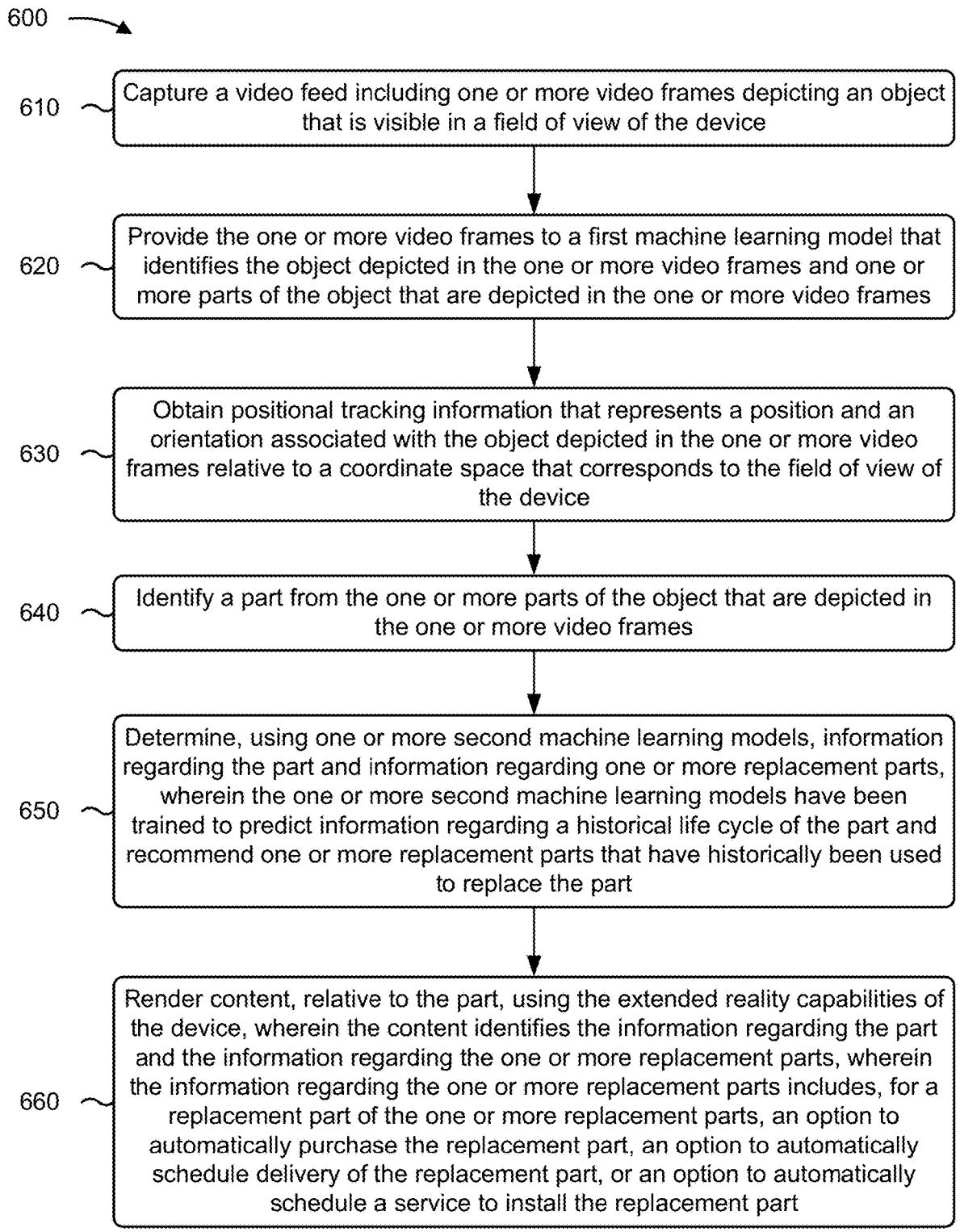
FIGS. 6-8 are flowcharts of example processes for visualizing vehicle part replacement information using extended reality.

FIG. 6 is a flowchart of an example process 600 for visualizing vehicle part replacement information using extended reality. In some implementations, one or more process blocks of FIG. 6 may be performed by a device (e.g., extended reality device 430). In some implementations, one or more process blocks of FIG. 6 may be performed by another device or a group of devices separate from or including the device, such as a part information visualization system (e.g., part information visualization system 401).

As shown in FIG. 6, process 600 may include capturing a video feed including one or more video frames depicting an object that is visible in a field of view of the device (block 610). For example, the device (e.g., using processor 520, memory 530, storage component 540, input component 550, output component 560, communication interface 570, and/or the like) may capture a video feed including one or more video frames depicting an object that is visible in a field of view of the device, as described above.

As further shown in FIG. 6, process 600 may include providing the one or more video frames to a first machine learning model that identifies the object depicted in the one or more video frames and one or more parts of the object that are depicted in the one or more video frames (block 620). For example, the device (e.g., using processor 520, memory 530, storage component 540, input component 550, output component 560, communication interface 570, and/or the like) may provide the one or more video frames to a first machine learning model that identifies the object depicted in the one or more video frames and one or more parts of the object that are depicted in the one or more video frames, as described above.

As further shown in FIG. 6, process 600 may include obtaining positional tracking information that represents a position and an orientation associated with the object depicted in the one or more video frames relative to a coordinate space that corresponds to the field of view of the device (block 630). For example, the device (e.g., using processor 520, memory 530, storage component 540, input component 550, output component 560, communication interface 570, and/or the like) may obtain positional tracking information that represents a position and an orientation associated with the object depicted in the one or more video frames relative to a coordinate space that corresponds to the field of view of the device, as described above.

As further shown in FIG. 6, process 600 may include identifying a part from the one or more parts of the object that are depicted in the one or more video frames (block 640). For example, the device (e.g., using processor 520, memory 530, storage component 540, input component 550, output component 560, communication interface 570, and/or the like) may identify a part from the one or more parts of the object that are depicted in the one or more video frames, as described above.

As further shown in FIG. 6, process 600 may include determining, using one or more second machine learning models, information regarding the part and information regarding one or more replacement parts, wherein the one or more second machine learning models have been trained to predict information regarding a historical life cycle of the part and recommend one or more replacement parts that have historically been used to replace the part (block 650). For example, the device (e.g., using processor 520, memory 530, storage component 540, input component 550, output component 560, communication interface 570, and/or the like) may determine, using one or more second machine learning models, information regarding the part and information regarding one or more replacement parts, as described above. In some implementations, the one or more second machine learning models have been trained to predict information regarding a historical life cycle of the part and recommend one or more replacement parts that have historically been used to replace the part.

As further shown in FIG. 6, process 600 may include rendering content, relative to the part, using the extended reality capabilities of the device, wherein the content identifies the information regarding the part and the information regarding the one or more replacement parts, wherein the information regarding the one or more replacement parts includes, for a replacement part of the one or more replacement parts, an option to automatically purchase the replacement part, an option to automatically schedule delivery of the replacement part, or an option to automatically schedule a service to install the replacement part (block 660). For example, the device (e.g., using processor 520, memory 530, storage component 540, input component 550, output component 560, communication interface 570, and/or the like) may render content, relative to the part, using the extended reality capabilities of the device, as described above. In some implementations, the content identifies the information regarding the part and the information regarding the one or more replacement parts. In some implementations, the information regarding the one or more replacement parts includes, for a replacement part of the one or more replacement parts, an option to automatically purchase the replacement part, an option to automatically schedule delivery of the replacement part, or an option to automatically schedule a service to install the replacement part.

Process 600 may include additional implementations, such as any single implementation or any combination of implementations described below and/or in connection with one or more other processes described elsewhere herein.

In a first implementation, the content includes two-dimensional overlays to be placed over images of the part that are depicted in the one or more video frames based on the positional tracking information.

In a second implementation, alone or in combination with the first implementation, the content includes information based on aggregate data relating to one or more quality control issues associated with a group of parts of which the part is a member.

In a third implementation, alone or in combination with one or more of the first and second implementations, the information regarding the part includes a remaining lifespan of the part.

In a fourth implementation, alone or in combination with one or more of the first through third implementations, the information regarding the one or more replacement parts includes a lifespan of the one or more replacement parts.

In a fifth implementation, alone or in combination with one or more of the first through fourth implementations, the information regarding the one or more replacement parts includes a premature failure rate of the one or more replacement parts, where the premature failure rate is based on a comparison of a lifespan of the one or more replacement parts and historical failure data.

In a sixth implementation, alone or in combination with one or more of the first through fifth implementations, the content is first content, and process 600 further comprises identifying a plurality of parts from the one or more parts of the object that are depicted in the one or more video frames; determining, using the one or more second machine learning models, information regarding the plurality of parts and information regarding one or more replacement parts for the plurality of parts, and determining a total cost of owning the object based on the information regarding the plurality of parts and the information regarding one or more replacement parts for the plurality of parts, and rendering second content, relative to the plurality of parts, using the extended reality capabilities of the device, where the second content includes information regarding the total cost of owning the object.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
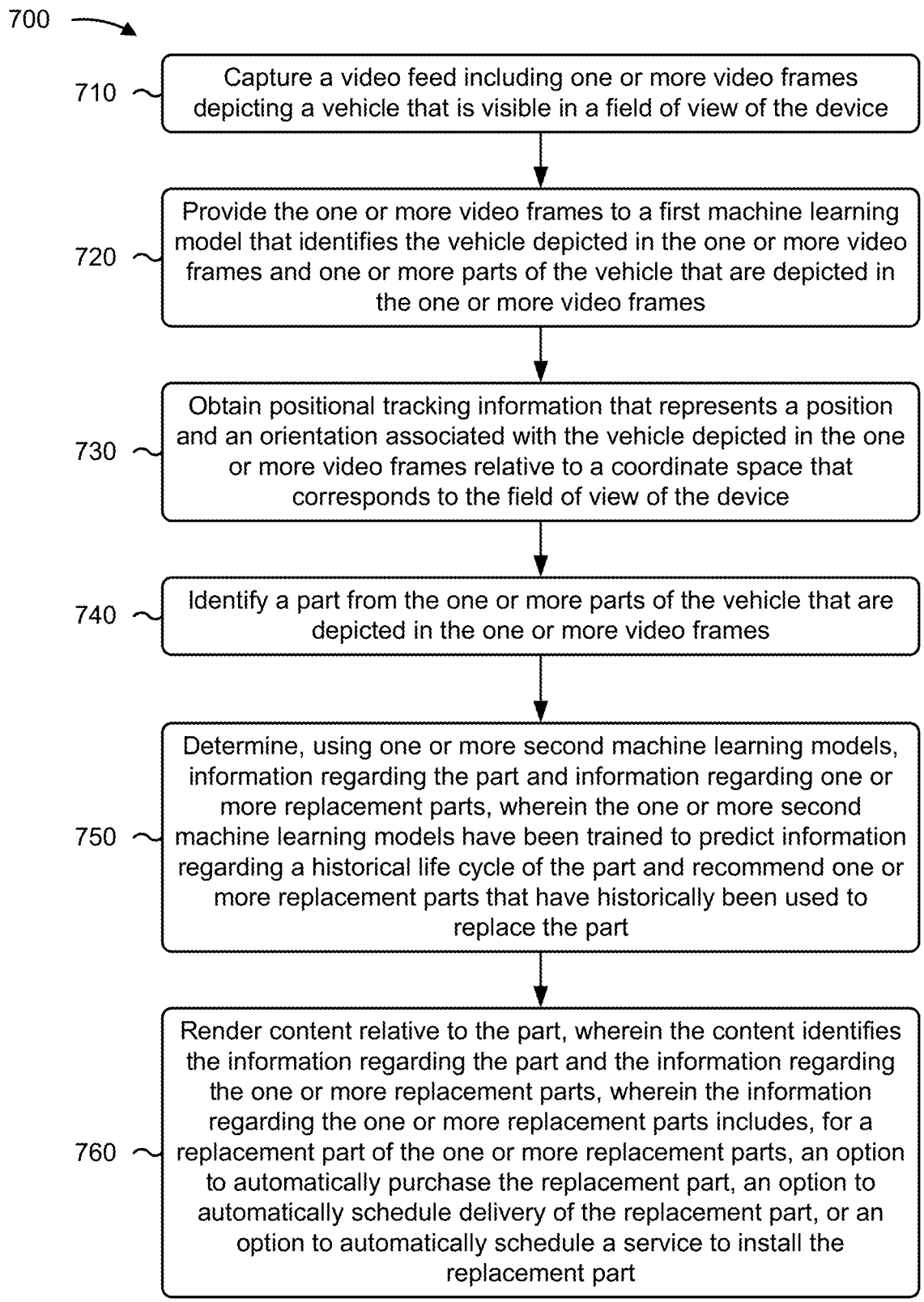

FIG. 7 is a flowchart of an example process 700 for visualizing vehicle part replacement information using extended reality. In some implementations, one or more process blocks of FIG. 7 may be performed by a device (e.g., extended reality device 430). In some implementations, one or more process blocks of FIG. 7 may be performed by another device or a group of devices separate from or including the device, such as a part information visualization system (e.g., part information visualization system 401).

As shown in FIG. 7, process 700 may include capturing a video feed including one or more video frames depicting a vehicle that is visible in a field of view of the device (block 710). For example, the device (e.g., using processor 520, memory 530, storage component 540, input component 550, output component 560, communication interface 570, and/or the like) may capture a video feed including one or more video frames depicting a vehicle that is visible in a field of view of the device, as described above.

As further shown in FIG. 7, process 700 may include providing the one or more video frames to a first machine learning model that identifies the vehicle depicted in the one or more video frames and one or more parts of the vehicle that are depicted in the one or more video frames (block 720). For example, the device (e.g., using processor 520, memory 530, storage component 540, input component 550, output component 560, communication interface 570, and/or the like) may provide the one or more video frames to a first machine learning model that identifies the vehicle depicted in the one or more video frames and one or more parts of the vehicle that are depicted in the one or more video frames, as described above.

As further shown in FIG. 7, process 700 may include obtaining positional tracking information that represents a position and an orientation associated with the vehicle depicted in the one or more video frames relative to a coordinate space that corresponds to the field of view of the device (block 730). For example, the device (e.g., using processor 520, memory 530, storage component 540, input component 550, output component 560, communication interface 570, and/or the like) may obtain positional tracking information that represents a position and an orientation associated with the vehicle depicted in the one or more video frames relative to a coordinate space that corresponds to the field of view of the device, as described above.

As further shown in FIG. 7, process 700 may include identifying a part from the one or more parts of the vehicle that are depicted in the one or more video frames (block 740). For example, the device (e.g., using processor 520, memory 530, storage component 540, input component 550, output component 560, communication interface 570, and/or the like) may identify a part from the one or more parts of the vehicle that are depicted in the one or more video frames, as described above.

As further shown in FIG. 7, process 700 may include determining, using one or more second machine learning models, information regarding the part and information regarding one or more replacement parts, wherein the one or more second machine learning models have been trained to predict information regarding a historical life cycle of the part and recommend one or more replacement parts that have historically been used to replace the part (block 750). For example, the device (e.g., using processor 520, memory 530, storage component 540, input component 550, output component 560, communication interface 570, and/or the like) may determine, using one or more second machine learning models, information regarding the part and information regarding one or more replacement parts, as described above. In some implementations, the one or more second machine learning models have been trained to predict information regarding a historical life cycle of the part and recommend one or more replacement parts that have historically been used to replace the part.

As further shown in FIG. 7, process 700 may include rendering content relative to the part, wherein the content identifies the information regarding the part and the information regarding the one or more replacement parts, wherein the information regarding the one or more replacement parts includes, for a replacement part of the one or more replacement parts, an option to automatically purchase the replacement part, an option to automatically schedule delivery of the replacement part, or an option to automatically schedule a service to install the replacement part (block 760). For example, the device (e.g., using processor 520, memory 530, storage component 540, input component 550, output component 560, communication interface 570, and/or the like) may render content relative to the part, as described above. In some implementations, the content identifies the information regarding the part and the information regarding the one or more replacement parts. In some implementations, the information regarding the one or more replacement parts includes, for a replacement part of the one or more replacement parts, an option to automatically purchase the replacement part, an option to automatically schedule delivery of the replacement part, or an option to automatically schedule a service to install the replacement part.

Process 700 may include additional implementations, such as any single implementation or any combination of implementations described below and/or in connection with one or more other processes described elsewhere herein.

In a first implementation, the content includes information based on aggregate data relating to one or more quality control issues associated with a group of vehicles of which the vehicle is a member.

In a second implementation, alone or in combination with the first implementation, the information regarding the part includes a remaining lifespan of the part.

In a third implementation, alone or in combination with one or more of the first and second implementations, the information regarding the one or more replacement parts includes a premature failure rate of the one or more replacement parts, where the premature failure rate is based on a comparison of a lifespan of the one or more replacement parts and historical failures.

In a fourth implementation, alone or in combination with one or more of the first through third implementations, the content is first content and process 700 further includes rendering second content relative to the part, wherein the second content includes instructions for replacing the part.

In a fifth implementation, alone or in combination with one or more of the first through fourth implementations, process 700 includes obtaining information regarding the vehicle via a machine-to-machine communication interface between the device and the vehicle.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
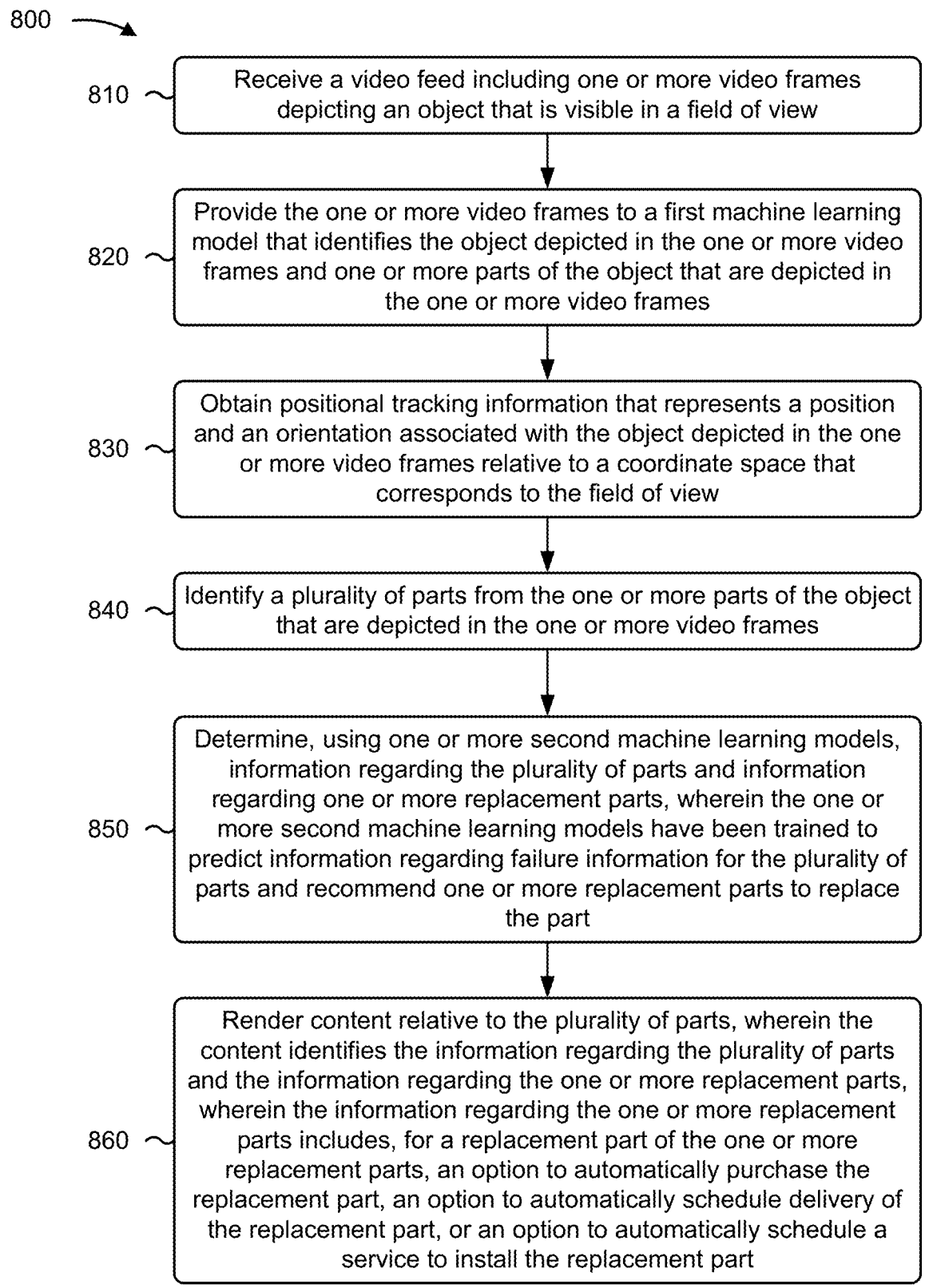

FIG. 8 is a flowchart of an example process 800 for visualizing vehicle part replacement information using extended reality. In some implementations, one or more process blocks of FIG. 8 may be performed by a device (e.g., extended reality device 430). In some implementations, one or more process blocks of FIG. 8 may be performed by another device or a group of devices separate from or including the device, such as a part information visualization system (e.g., part information visualization system 401.

As shown in FIG. 8, process 800 may include receiving a video feed including one or more video frames depicting an object that is visible in a field of view (block 810). For example, the device (e.g., using processor 520, memory 530, storage component 540, input component 550, output component 560, communication interface 570, and/or the like) may receive a video feed including one or more video frames depicting an object that is visible in a field of view, as described above.

As further shown in FIG. 8, process 800 may include providing the one or more video frames to a first machine learning model that identifies the object depicted in the one or more video frames and one or more parts of the object that are depicted in the one or more video frames (block 820). For example, the device (e.g., using processor 520, memory 530, storage component 540, input component 550, output component 560, communication interface 570, and/or the like) may provide the one or more video frames to a first machine learning model that identifies the object depicted in the one or more video frames and one or more parts of the object that are depicted in the one or more video frames, as described above.

As further shown in FIG. 8, process 800 may include obtaining positional tracking information that represents a position and an orientation associated with the object depicted in the one or more video frames relative to a coordinate space that corresponds to the field of view (block 830). For example, the device (e.g., using processor 520, memory 530, storage component 540, input component 550, output component 560, communication interface 570, and/or the like) may obtain positional tracking information that represents a position and an orientation associated with the object depicted in the one or more video frames relative to a coordinate space that corresponds to the field of view, as described above.

As further shown in FIG. 8, process 800 may include identifying a plurality of parts from the one or more parts of the object that are depicted in the one or more video frames (block 840). For example, the device (e.g., using processor 520, memory 530, storage component 540, input component 550, output component 560, communication interface 570, and/or the like) may identify a plurality of parts from the one or more parts of the object that are depicted in the one or more video frames, as described above.

As further shown in FIG. 8, process 800 may include determining, using one or more second machine learning models, information regarding the plurality of parts and information regarding one or more replacement parts, wherein the one or more second machine learning models have been trained to predict information regarding failure information for the plurality of parts and recommend one or more replacement parts to replace the part (block 850). For example, the device (e.g., using processor 520, memory 530, storage component 540, input component 550, output component 560, communication interface 570, and/or the like) may determine, using one or more second machine learning models, information regarding the plurality of parts and information regarding one or more replacement parts, as described above. In some implementations, the one or more second machine learning models have been trained to predict information regarding failure information for the plurality of parts and recommend one or more replacement parts to replace the part.

As further shown in FIG. 8, process 800 may include rendering content relative to the plurality of parts, wherein the content identifies the information regarding the plurality of parts and the information regarding the one or more replacement parts, wherein the information regarding the one or more replacement parts includes, for a replacement part of the one or more replacement parts, an option to automatically purchase the replacement part, an option to automatically schedule delivery of the replacement part, or an option to automatically schedule a service to install the replacement part (block 860). For example, the device (e.g., using processor 520, memory 530, storage component 540, input component 550, output component 560, communication interface 570, and/or the like) may render content relative to the plurality of parts, as described above. In some implementations, the content identifies the information regarding the plurality of parts and the information regarding the one or more replacement parts. In some implementations, the information regarding the one or more replacement parts includes, for a replacement part of the one or more replacement parts, an option to automatically purchase the replacement part, an option to automatically schedule delivery of the replacement part, or an option to automatically schedule a service to install the replacement part.

Process 800 may include additional implementations, such as any single implementation or any combination of implementations described below and/or in connection with one or more other processes described elsewhere herein.

In a first implementation, the content includes information based on aggregate data relating to one or more quality control issues associated with a group of objects of which the object is a member.

In a second implementation, alone or in combination with the first implementation, the information regarding the plurality of parts includes, for each part of the plurality of parts, an indication of a remaining lifespan.

In a third implementation, alone or in combination with one or more of the first and second implementations, a color of the indication for each part of the plurality of parts varies based on the remaining lifespan of the part with which the indication is associated.

In a fourth implementation, alone or in combination with one or more of the first through third implementations, the information regarding the one or more replacement parts includes information identifying a lifespan of the one or more replacement parts.

In a fifth implementation, alone or in combination with one or more of the first through fourth implementations, the information regarding the one or more replacement parts includes a premature failure rate of the one or more replacement parts, the premature failure rate is based on a comparison of a lifespan of the one or more replacement parts and historical failure data.

In a sixth implementation, alone or in combination with one or more of the first through fifth implementations, the content is first content, and process 800 further includes determining, using the one or more second machine learning models, information regarding the plurality of parts and information regarding one or more replacement parts for the plurality of parts, determining a total cost of owning the object based on the information regarding the plurality of parts and the information regarding one or more replacement parts for the plurality of parts; and rendering second content relative to the plurality of parts, wherein the second content includes information regarding the total cost of owning the object.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   capturing, by a device having extended reality capabilities, a video feed including one or more video frames depicting an object that is visible in a field of view of the device;
   providing, by the device, the one or more video frames to a first machine learning model that identifies the object depicted in the one or more video frames and one or more parts of the object that are depicted in the one or more video frames;
   obtaining, by the device, positional tracking information that represents a position and an orientation associated with the object depicted in the one or more video frames relative to a coordinate space that corresponds to the field of view of the device;
   identifying, by the device, a part from the one or more parts of the object that are depicted in the one or more video frames;
   determining, by the device and using one or more second machine learning models, information regarding the part and information regarding one or more replacement parts,
   wherein the one or more second machine learning models have been trained to predict information regarding a historical life cycle of the part and recommend one or more replacement parts that have historically been used to replace the part; and
   rendering, by the device, content, relative to the part, using the extended reality capabilities of the device,
   wherein the content identifies the information regarding the part and the information regarding the one or more replacement parts,
   wherein the information regarding the one or more replacement parts includes, for a replacement part of the one or more replacement parts, an option to automatically purchase the replacement part, an option to automatically schedule delivery of the replacement part, or an option to automatically schedule a service to install the replacement part.

2. The method of claim 1, wherein the content includes two-dimensional overlays to be placed over images of the part that are depicted in the one or more video frames based on the positional tracking information.

3. The method of claim 1, wherein the content includes information based on aggregate data relating to one or more quality control issues associated with a group of parts of which the part is a member.

4. The method of claim 1, wherein the information regarding the part includes a remaining lifespan of the part.

5. The method of claim 1, wherein the information regarding the one or more replacement parts includes a lifespan of the one or more replacement parts.

6. The method of claim 1, wherein the information regarding the one or more replacement parts includes a premature failure rate of the one or more replacement parts,
   wherein the premature failure rate is based on a comparison of a lifespan of the one or more replacement parts and historical failure data.

7. The method of claim 1, wherein the content is first content, and
   wherein the method further comprises:
   identifying a plurality of parts from the one or more parts of the object that are depicted in the one or more video frames;
   determining, using the one or more second machine learning models, information regarding the plurality of parts and information regarding one or more replacement parts for the plurality of parts; and
   determining a total cost of owning the object based on the information regarding the plurality of parts and the information regarding one or more replacement parts for the plurality of parts; and
   rendering second content, relative to the plurality of parts, using the extended reality capabilities of the device,
   wherein the second content includes information regarding the total cost of owning the object.

8. A device, comprising:
   one or more memories; and
   one or more processors, communicatively coupled to the one or more memories, configured to:
   capture a video feed including one or more video frames depicting a vehicle that is visible in a field of view of the device;
   provide the one or more video frames to a first machine learning model that identifies the vehicle depicted in the one or more video frames and one or more parts of the vehicle that are depicted in the one or more video frames;

obtain positional tracking information that represents a position and an orientation associated with the vehicle depicted in the one or more video frames relative to a coordinate space that corresponds to the field of view of the device;

identify a part from the one or more parts of the vehicle that are depicted in the one or more video frames;

determine, using one or more second machine learning models, information regarding the part and information regarding one or more replacement parts, wherein the one or more second machine learning models have been trained to predict information regarding a historical life cycle of the part and recommend one or more replacement parts that have historically been used to replace the part; and render content relative to the part, wherein the content identifies the information regarding the part and the information regarding the one or more replacement parts, wherein the information regarding the one or more replacement parts includes, for a replacement part of the one or more replacement parts, an option to automatically purchase the replacement part, an option to automatically schedule delivery of the replacement part, or an option to automatically schedule a service to install the replacement part.

9. The device of claim 8, wherein the content includes information based on aggregate data relating to one or more quality control issues associated with a group of vehicles of which the vehicle is a member.

10. The device of claim 8, wherein the information regarding the part includes a remaining lifespan of the part.

11. The device of claim 8, wherein the information regarding the one or more replacement parts includes a premature failure rate of the one or more replacement parts, wherein the premature failure rate is based on a comparison of a lifespan of the one or more replacement parts and historical failures.

12. The device of claim 8, wherein the content is first content, and
wherein the one or more processors are further configured to:
render second content relative to the part,
    wherein the second content includes instructions for replacing the part.

13. The device of claim 8, wherein the one or more processors are further configured to:
obtain information regarding the vehicle via a machine-to-machine communication interface between the device and the vehicle.

14. A non-transitory computer-readable medium storing instructions, the instructions comprising:
one or more instructions that, when executed by one or more processors, cause the one or more processors to:
receive a video feed including one or more video frames depicting an object that is visible in a field of view;
provide the one or more video frames to a first machine learning model that identifies the object depicted in the one or more video frames and one or more parts of the object that are depicted in the one or more video frames;
obtain positional tracking information that represents a position and an orientation associated with the object depicted in the one or more video frames relative to a coordinate space that corresponds to the field of view;
identify a plurality of parts from the one or more parts of the object that are depicted in the one or more video frames;
determine, using one or more second machine learning models, information regarding the plurality of parts and information regarding one or more replacement parts,
    wherein the one or more second machine learning models have been trained to predict information regarding failure information for the plurality of parts and recommend one or more replacement parts to replace the part; and
render content relative to the plurality of parts,
    wherein the content identifies the information regarding the plurality of parts and the information regarding the one or more replacement parts,
        wherein the information regarding the one or more replacement parts includes, for a replacement part of the one or more replacement parts, an option to automatically purchase the replacement part, an option to automatically schedule delivery of the replacement part, or an option to automatically schedule a service to install the replacement part.

15. The non-transitory computer-readable medium of claim 14, wherein the content includes information based on aggregate data relating to one or more quality control issues associated with a group of objects of which the object is a member.

16. The non-transitory computer-readable medium of claim 14, wherein the information regarding the plurality of parts includes, for each part of the plurality of parts, an indication of a remaining lifespan.

17. The non-transitory computer-readable medium of claim 16, wherein a color of the indication for each part of the plurality of parts varies based on the remaining lifespan of the part with which the indication is associated.

18. The non-transitory computer-readable medium of claim 14, wherein the information regarding the one or more replacement parts includes information identifying a lifespan of the one or more replacement parts.

19. The non-transitory computer-readable medium of claim 14, wherein the information regarding the one or more replacement parts includes a premature failure rate of the one or more replacement parts,
wherein the premature failure rate is based on a comparison of a lifespan of the one or more replacement parts and historical failure data.

20. The non-transitory computer-readable medium of claim 14, wherein the content is first content, and
wherein the one or more instructions, when executed by the one or more processors, further cause the one or more processors to:
determine, using the one or more second machine learning models, information regarding the plurality of parts and information regarding one or more replacement parts for the plurality of parts;
determine a total cost of owning the object based on the information regarding the plurality of parts and the information regarding one or more replacement parts for the plurality of parts; and
render second content relative to the plurality of parts, wherein the second content includes information regarding the total cost of owning the object.

\* \* \* \* \*